United States Patent [19]

Brown

[11] Patent Number: 4,580,998

[45] Date of Patent: Apr. 8, 1986

[54] METAL DRIVE V-BELT

[75] Inventor: Evans L. Brown, Rochester, Mich.

[73] Assignee: General Motors Corporation, Detroit, Mich.

[21] Appl. No.: 705,075

[22] Filed: Feb. 25, 1985

[51] Int. Cl.[4] .......................... F16G 1/00; F16G 5/00
[52] U.S. Cl. .................................... 474/201; 474/242
[58] Field of Search .............. 474/201, 240, 242, 244, 474/246, 249–252, 265

[56] References Cited

U.S. PATENT DOCUMENTS 3,949,621 4/1976 Beusink et al. ................. 474/242 X
4,498,892 2/1985 Huntley ............................. 474/201

FOREIGN PATENT DOCUMENTS 0109556 5/1984 European Pat. Off. ........... 474/242

Primary Examiner—Stephen J. Novosad
Assistant Examiner—Thuy M. Bui
Attorney, Agent, or Firm—Donald F. Scherer

[57] ABSTRACT

A metal drive V-belt has a prefolded portion forming a plurality of abutting drive blocks. The drive blocks have longitudinally aligned lateral slots in which are disposed circumferentially extending radially abutting nested continuous metal band members. The metal band members maintain the drive blocks in a continuous loop. The slots have smooth radius corners to provide stress relief. The radial innermost of the nested bands have a chamfer formed on the inner edges thereof and a longitudinally extending locking bead which mates with the next radial outermost continuous band.

3 Claims, 3 Drawing Figures

METAL DRIVE V-BELT

BACKGROUND OF THE INVENTION

This invention relates to drive V-belts and more particularly to metal drive V-belts.

In the prior art metal belts, the drive blocks have lateral slots in which continuous metal bands are contained. These prior art metal bands do not provide for the prevention of lateral shifting of the metal bands such that the radial innermost corner of the slot must be machined in order to prevent contact with the belts. Contact in this corner is not desirable since relative movement between the belts and the drive blocks can result in some damage. The need for machining this corner increases the complexity of the manufacturing operations of the drive blocks used with the metal belts.

SUMMARY OF THE INVENTION

The present invention prevents contact between the radial innermost corner of the lateral slot and the inner bands by incorporating a longitudinally extending locking bead which laterally aligns the bands. The locking beads can be formed in the bands after they are nested as a unit and prior to the installation thereof in the slots of the drive blocks. The lateral inner edge of the radial inner bands can be chamfered at the same time the locking bead is formed or in a separate operation. The locking bead can be formed by a simple rolling process while the chamfer can be ground.

It is an object of this invention to provide an improved metal drive V-belt having a plurality of metal drive blocks maintained in a continuous loop by a plurality of continuous metal bands wherein the metal bands are prevented from relative lateral migration by longitudinal locking beads formed in at least some of the radial inner most radial bands.

It is another object of this invention to provide an improved metal drive belt having a plurality of metal drive blocks maintained in a continuous loop by a plurality of nested radially abutting continuous metal bands disposed in laterally formed longitudinally extending slots formed in the drive blocks wherein the bands are prevented from relative lateral migration by longitudinal locking beads formed in at least some of the radial innermost metal bands and wherein the metal bands have a chamfered edge adjacent the radial innermost corner of the slot, and the slot has a relief radius tangential to the sides of the slot at said corner.

DESCRIPTION OF THE PREFERRED EMBODIMENT

Figure 1:
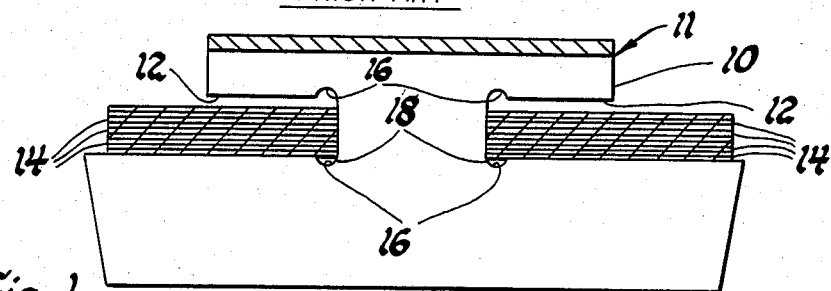
FIG. 1 is a sectional view taken through the longitudinal axis of a prior art belt.

FIG. 1 shows a prior art V-belt which may be constructed in accordance with the teachings in the names of Cataldo and Hall of U.S. Ser. No. 614,660 filed on May 29, 1984, and assigned to the assignee of the present invention, or the metal belt shown in the name of Cataldo U.S. Ser. No. 614,749 filed on May 29, 1984, and assigned to the assignee of the present invention.

Both of the above described prior art belts have drive blocks 10 incorporated in a fan-folded metal member 11, which have formed therein laterally extending longitudinally aligned slots 12 in which are disposed a plurality of continuous metal band members 14. The slots 12 have formed at the radial inner corners thereof a stress-relief pattern 16. The stress-relief pattern 16 eliminates the need for machining a perfectly square inner corner for the slot such that interference between the radial inner edge 18 of metal bands 14 and the corner of slots 12 will not occur.

As is well-known with the type of metal V-belt shown, the bands 14 migrate longitudinally relative to the drive blocks 10. It is this longitudinal migration which would cause damage to either the innermost bands 14 or the drive blocks 10 if the above-mentioned interference were to occur.

The metal belt shown in FIG. 1 may also be constructed in accordance with the well-known prior art metal V-belts in which each of the drive blocks is a separately machined structure. Even using individual drive blocks does not eliminate the need for the prevention of interference between the radial innermost corners of the metal bands and the slots.

Figure 2:
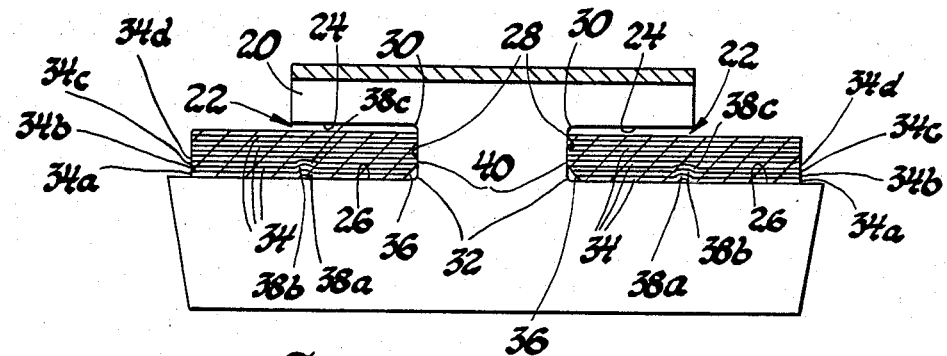
FIG. 2 is a sectional view taken through the longitudinal axis of a metal belt incorporating the present invention.

FIG. 2 describes a metal V-belt having a plurality of drive blocks 20 which can be constructed in accordance with the fan-folded structures described in the above enumerated U.S. patent applications. In the alternative, the drive blocks 20 can be formed as individual components, as is well-known. The drive blocks 20 incorporate a slot 22 having a laterally extending upper surface 24 and a laterally extending lower surface 26. The laterally extending surfaces 24 and 26 are joined by a radially extending side 28. The surfaces 24, 26 and side 28 are joined at corners 30 and 32. These corners are formed with the conventional stress-relief radii which are tangential to the respective lateral surfaces 24 or 26 and the joining radial side 28. The drive belt also includes a plurality of nested continuous metal bands 34.

As is seen in FIG. 2, the three innermost bands 34a, 34b and 34c, have a chamfered edge 36. The bands 34a–34c also have formed therein locking beads 38a, 38b and 38c, respectively. These locking beads 38a–38c extend longitudinally for the entire circumference of the respective metal bands 34a–34c. These locking beads maintain the bands 34a–34c in lateral alignment such that the chamfered edge 36 thereof cannot migrate laterally into interfering relationship with corner 32. The radial outermost locking bead 38c also maintains the next outermost band 34d in lateral alignment through a locking bead formed therein. The lateral inner edge 40 of band 34d is a flat surface which will move smoothly along the flat surfaces 28 of the slots 22.

Figure 3:
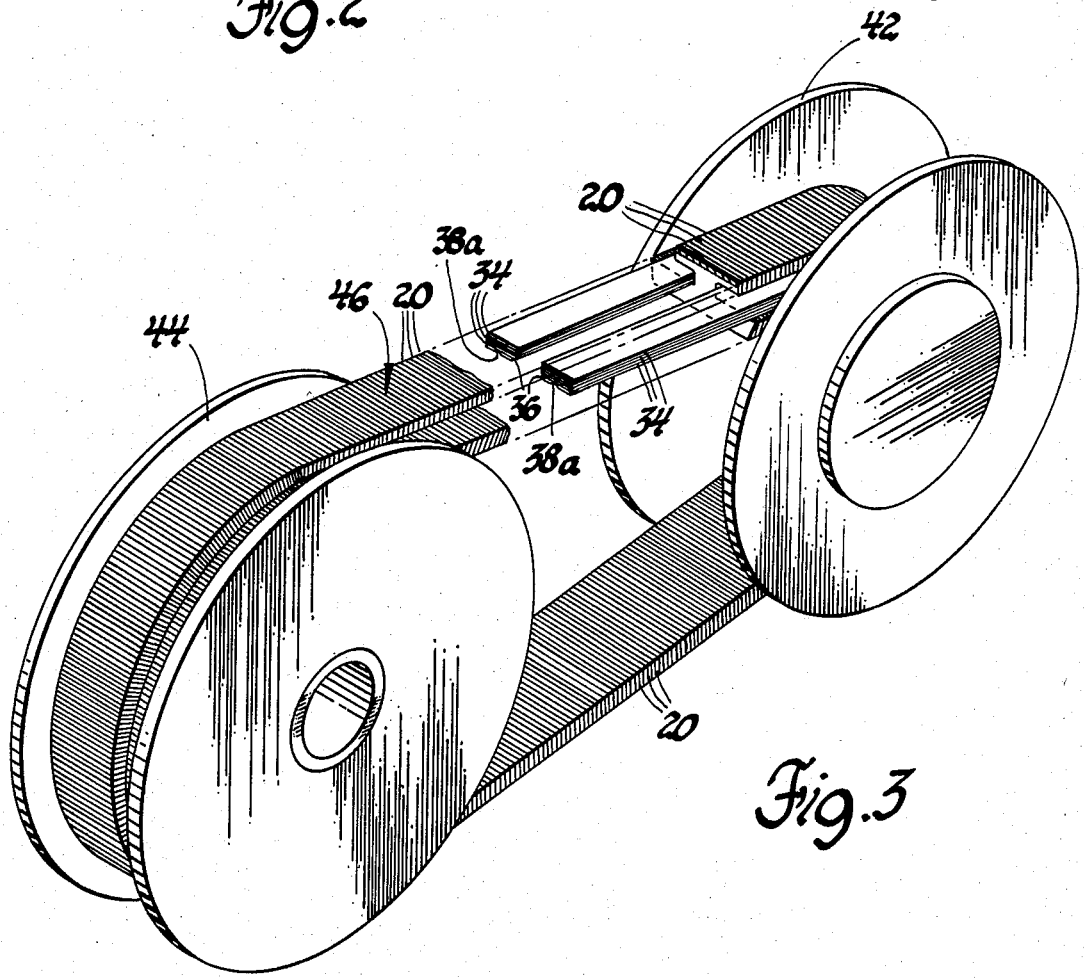
FIG. 3 is an isometric view of a metal V-belt incorporating the present invention and positioned on a pair of pulleys.

FIG. 3 is an isometric view of a pulley drive system wherein a pair of V-grooved pulleys 42 and 44 are engaged by a metal V-belt 46 incorporating the drive blocks 20 and continuous metal bands 34 described above in FIG. 2. As is well-known, the V-belt 46 transmits power from one pulley to the other. The pulleys 42 and 44 can be either of the fixed type or variable type. With the variable type pulley, the drive ratio from one pulley to the other can be infinitely varied within a predetermined ratio range.

The drive belt 46 described in FIG. 2 and incorporating the locking beads 38a–38c and chamfered edges permits a more economically manufactured article and does not detract from the operating performance of the metal V-belt. The structure of FIG. 2 is described as utilizing the fan-folded type of drive blocks, however, it will be appreciated by those familiar with the drive belt art, that the individual type drive blocks can also be used.

It will also be recognized that the locking beads 38a–38c can be accomplished with a simple rolling procedure with the bands in the nested relationship prior to installation in the slots 22. The locking beads have been described as extending radially outward only through the innermost of the bands 34. If desired, it is possible to have the locking beads extend from the radially innermost to the radially outermost of the bands 34 thereby assuring that lateral alignment is consistent. However, it is more economical and requires less machining power to manufacture only the radially innermost bands as described above.

The embodiments of the invention in which an exclusive property or privilege is claimed are defined as follows:

1. An improvement in metal drive belts having a plurality of continuous metal bands disposed radially in circumferential abutting relation, and a plurality of drive blocks disposed longitudinally on the metal bands with adjacent drive blocks being in abutment, each drive block having at least one three-sided slot in which the continuous metal bands are disposed; the improvement comprising one side of said slot joining at least one of the other sides of said slots to form a circular section the center of which is equally spaced from and noncoincident with the joined sides; the radial innermost of said continuous metal bands having a chamfered surface adjacent the joint of said joined sides; and a plurality of the radial innermost of said continuous metal bands each having a circumferentially extending locking bead engaging the next radial outer continuous metal band.

2. An improvement in metal drive belts having a plurality of continuous metal bands disposed radially in circumferential abutting relation, and a plurality of drive blocks disposed longitudinally on the metal bands with adjacent drive blocks being in abutment, each drive block having at least one three-sided slot in which the continuous metal bands are disposed; the improvement comprising one side of said slot joining at least one of the other sides of said slots to form a circular section which is tangential to the joined sides; the radial innermost of said continuous metal bands having a chamfered surface adjacent the joint of said joined sides; and locking bead means disposed circumferentially on each of said bands having said chamfered surface for maintaining lateral alignment of adjacent bands.

3. An improvement in metal drive belts having a plurality of continuous metal bands disposed radially in circumferential abutting relation, and a plurality of drive blocks disposed longitudinally on the metal bands with adjacent drive blocks being in abutment, each drive block having at least one three-sided slot having a radial inner corner in which slot the continuous metal bands are disposed; the improvement comprising the radial innermost of said continuous metal bands having a chamfered surface adjacent radial inner corner; and circumferentially extending locking bead means formed in each band having said chamfer for engaging the next outer continuous metal band for preventing lateral migration there-between.

* * * * *